3,407,066
LIGHT SENSITIVE DIAZONIUM COMPOUNDS
AND DIAZOTYPE MATERIALS
Henry Mustacchi, Chiswick, London, and Henry Thomas Foley, Thames Ditton, Surrey, England, assignors to GAF (Great Britain) Limited, London, England
No Drawing. Filed June 11, 1964, Ser. No. 374,285
Claims priority, application Great Britain, June 18, 1963, 24,210/63
8 Claims. (Cl. 96—91)

ABSTRACT OF THE DISCLOSURE

Light-sensitive diazonium compounds and diazotype materials containing the same, prepared from amines of the general formula

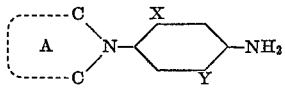

in which A is a heterocyclic ring containing at most, one hetero atom in addition to the nitrogen, X is a lower alkoxy group and Y is either

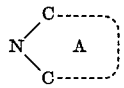

in which A has the same significance as above, alkylthio or arylthio; and preparation of said amines from 5-chloro-4-nitro-2-alkoxy anilines.

---

The present invention relates to novel compounds, processes for their production and improved diazotype materials containing the novel compounds.

According to the present invention we provide novel diazonium compounds derived from novel amines of the general Formula I:

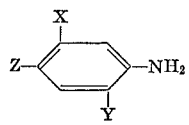

wherein Z is

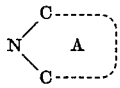

in which A represents a substituted or unsubstituted heterocyclic ring or —S—$R_1$ in which $R_1$ denotes substituted or unsubstituted alkyl, hydroxy alkyl, aryl, or aralkyl; and X and Y which may be like or unlike are chosen from —O—$R_2$, —S—$R_2$ and

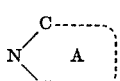

in which A has the same significance as above, and $R_2$ denotes substituted or unsubstituted alkyl, hydroxy alkyl, aryl, or aralkyl, with the proviso that when X and Y are both —O—$R_2$ they are not alike. Examples of A are morpholine, piperidine, piperazine, and pyrrolidine.

A process for the production of the novel amines hav-ing the general Formula I as defined above, comprises reacting an amine having the general Formula X:

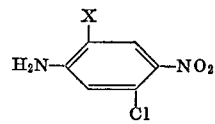

wherein X has the significance stated above, with a thiol compound, a phenoxy compound, morpholine, piperidine, piperazine or pyrrolidine in a reflux reaction at an elevated temperature to yield an amine having the general Formula XI:

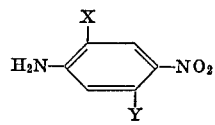

wherein X and Y have the significances stated above, replacing the amino group of Compound XI by a chlorine atom using a Sandmeyer reaction to give a compound having the general Formula XII:

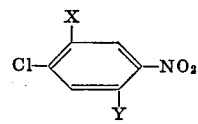

reacting this compound with morpholine, piperidine, piperazine, pyrrolidine or a thiol compound in a reflux reaction at an elevated temperature to yield a compound having the general Formula XIII:

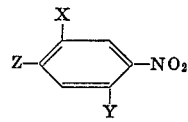

wherein X, Y and Z have the above-mentioned significances, and reducing the nitro group of this compound by a method known per se to obtain the required amine having the general Formula I.

The said reduction may be effected by catalytic hydrogenation or by the action of hydrochloric acid on zinc.

By way of illustration, four processes will now be described with reference to Equations a, b, c and d.

(a)
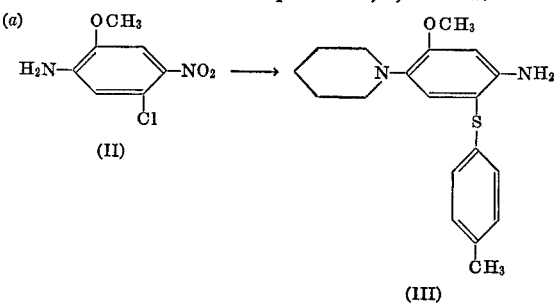

2-methoxy-4-nitro-5-chloro-aniline (Compound II) is reacted with para-toluene thiol to form 4-nitro-5-para toluene thio-2-methoxy-aniline, which conversion may be carried out by reflux reaction at an elevated temperature, for example at about 80° C., in alkaline alcoholic medium, for example potassium hydroxide/ethyl alcohol. The amino group is replaced, using for instance the Sandmeyer reaction, by a chlorine atom to give 4 - nitro - 2- methoxy-5-para toluene thio-chlorobenzene. The latter compound is reacted with piperidine to give 4-nitro-2-methoxy-5-para-toluene thio-1-piperidino-benzene, which reaction may be effected under reflux, at an elevated temperature for example at about 110° C. The 4-nitro compound is reduced, for example with zinc and hydrochloric acid, to give Compound III. This Compound III may be diazotized using sodium nitrite to give 4 - N - piperidino-3-methoxy-6 para-toluene thiobenzene diazonium salt.

Similarly, Compound IV

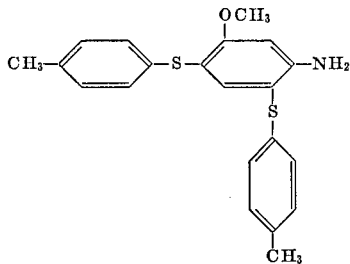

which may be diazotized using sodium nitrite to give 4-para - toluene-thio-3-methoxy-6-para-toluene-thiobenzene diazonium salt, may be prepared as above, except that instead of reacting with piperidine the corresponding reaction step is effected with para-toluene thiol.

Also, Compound V

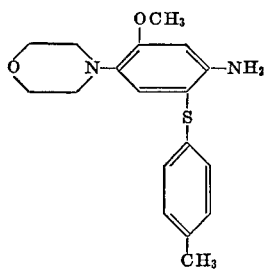

which may be diazotized using sodium nitrite to give 4-N-morpholino - 3-methoxy-6-para-toluene-thiobenzene diazonium salt, may be prepared as above, except that instead of reacting with piperidine the corresponding reaction step is effected with morpholine.

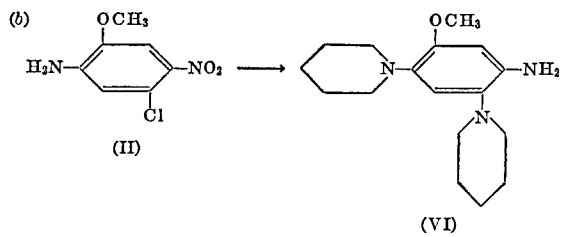

2-methoxy-4-nitro-5-chloro-aniline (Compound II) is reacted with piperidine, e.g., by refluxing at an elevated temperature, to form 2-methoxy-4-nitro-5-piperidino-aniline. The amino group is replaced, using for instance the Sandmeyer reaction, by a chlorine atom to give 4-nitro-2-methoxy-5-piperidino-chlorobenzene. The latter compound may be reacted with piperidine under reflux at an elevated temperature to give 4 - nitro - 2 - methoxy-5-piperidino-1-piperidino-benzene. The 4-nitro compound is reduced for example with zinc and hydrochloric acid, to give Compound VI. This Compound VI may be diazotised using sodium nitrite to give 4-N-piperidino-3-methoxy-6-piperidino-benzene diazonium salt.

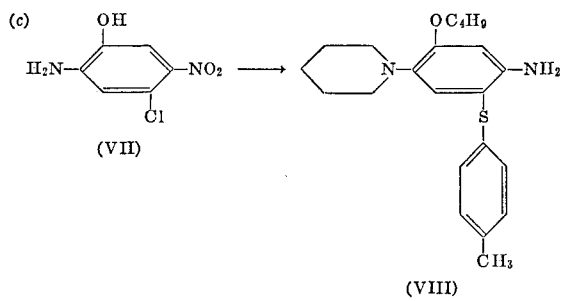

Compound VIII, which may be diazotised using sodium nitrite to give 4 - N - piperidino - 3 - butoxy - 6-para-toluene-thiobenzene diazonium salt, may be prepared from 2 - hydroxy - 4-nitro-5-chloro aniline (Compound VII). This compound is reacted with acetic anhydride to give 2-hydroxy-4-nitro-5-chloro-acetanilide, which reaction may be carried out for example in acetic acid under reflux. The hydrogen of the hydroxy group is replaced using butyl bromide under reflux to give 2 - butoxy - 4-nitro - 5 - chloro - acetanilide which is reacted with para-toluene thiol to form 4-nitro-5-para-toluene thio-2-butoxy aniline, which conversion may be carried out by reflux reaction at an elevated temperature, in alkaline/alcoholic medium, at 80° C., for example in potassium hydroxide/ethyl alcohol. The amino group is replaced, using for instance the Sandmeyer reaction, by a chlorine atom to give 4-nitro-2-butoxy-5-para toluene thio-chlorobenzene. The latter compound is reacted with piperidine to give 4 - nitro-2-butoxy-5-para-toluene thio-1-piperidino-benzene, which reaction may be effected under reflux at an elevated temperature, for example at about 110° C. The 4-nitro compound is reduced for example with zinc and hydrochloric acid to give Compound VIII. This Compound VIII may be diazotised using sodium nitrite to give 4 - N-piperidino-3-butoxy-6-para-toluene-thiobenzene diazonium salt.

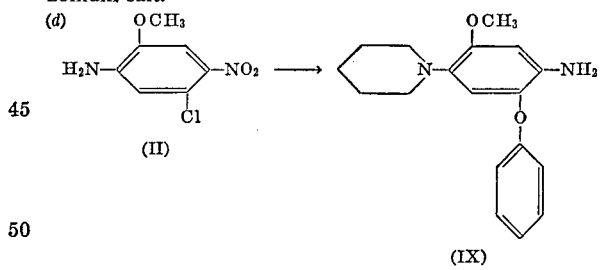

Compound IX, which may be diazotised using sodium nitrite to give 4 - N - piperidino-3-methoxy-6-phenoxy benzene diazonium salt, may be prepared from 2-methoxy-4-nitro-5-chloro-aniline (Compound II) by refluxing Compound II with sodium phenoxide in for example xylene at about 140° C. to form 4-nitro-2-methoxy-5-phenoxy aniline. The amino group is replaced, using for instance the Sandmeyer reaction, by a chlorine atom to give 4 - nitro-2-methoxy-5-phenoxy-1-piperidino-benzene. The 4-nitro compound is reduced for example with zinc and hydrochloric acid to give Compound IX. This Compound IX may be diazotised using sodium nitrite to give 4 - N - piperidino-3-methoxy-6-phenoxy benzene diazonium salt.

This invention also provides a diazotype material comprising a light-sensitive layer containing a light-sensitive novel diazonium compound derived from a novel amine having the general Formula I, wherein X, Y and Z have the above-mentioned significances.

Especially advantageous amines for this application are Compounds III, IV, V, VI, VIII and IX, specified above, which are able to produce very satisfactory dark images with relatively quicker printing speeds as compared with known compounds of a similar structure.

The following examples illustrate the present invention.

EXAMPLE 1

A white base paper is coated with a sensitizing liquid having the following composition:

| | G. |
|---|---|
| Water | 100 |
| Tartaric acid | 0.5 |
| Aluminium sulphate | 1 |
| 4-N-piperidino-3-methoxy-6-para-toluene thio-benzene diazonium chloride, zinc chloride double salt | 1.5 |

The coated paper covered by a "master" tracing is exposed to a mercury vapour lamp to obtain a latent image. To develop the latent image a developing liquid is applied to the exposed coated paper. The developed diazotype copy showed a strong black image on a clear white background. The developing liquid has the following composition:

| | G. |
|---|---|
| Water | 568 |
| Phloroglucinol | 2.5 |
| Sodium formate | 50 |
| Thiourea | 3 |
| Sodium benzoate | 10 |
| Sorbitol | 2.5 |

EXAMPLE 2

A white base paper is coated with a sensitizing liquid having the following composition:

| | | |
|---|---|---|
| Water | g | 100 |
| Citric acid | g | 4 |
| Thiourea | g | 4 |
| Urea | g | 5 |
| 4-N-piperidino-3-methoxy-6-piperidino-benzene diazonium chloride, zinc chloride double salt | g | 2 |
| 2,3 dihydroxy naphthalene-6-sulphonic acid (sodium salt) | g | 4 |
| Diethylene glycol | g | 6 |
| "Celacol" (a trade name) (3% solution) | cc | 7 |

The coated paper is exposed in the manner described in Example 1 and developed by gaseous ammonia. The developed diazotype copy showed a dark blue image on a clear white background.

EXAMPLE 3

A white base paper is coated with a sensitizing liquid having the following composition:

| | | |
|---|---|---|
| Water | g | 100 |
| Tartaric acid | g | 3 |
| Thiourea | g | 5 |
| 4-N-piperidino-3-methoxy-6-phenoxy-benzene diazonium chloride, zinc chloride double salt | g | 1.5 |
| 7-hydroxy 1-2 naphtho 4:5 imidazole | g | 2 |
| Glycerine | g | 5 |
| "Celacol" (3% solution) | cc | 10 |

The coated paper is exposed in the manner described in Example 1 and developed by gaseous ammonia. The developed copy showed a bright red image on a clear white background.

EXAMPLE 4

A tracing paper is coated with a sensitizing liquid having the following composition:

| | | |
|---|---|---|
| Water | g | 70 |
| Ethyl alcohol | cc | 30 |
| n-Butanol | cc | 5 |
| Citric acid | g | 0.5 |
| Ammonium chloride | g | 1 |
| 4-N-piperidino-3-methoxy-6-para-toluene-thio-benzene diazonium chloride, zinc chloride double salt | g | 2.5 |
| Gelatine | g | 2 |

The coated paper is exposed in the manner described in Example 1 and the latent diazotype image is developed by applying to the exposed coated paper a developing liquid having the following composition:

| | G. |
|---|---|
| Water | 568 |
| Sodium carbonate | 45 |
| Sodium hyposulphite | 22 |
| Sodium phosphate (tribasic) | 5 |
| Phloroglucinol | 2 |
| Acetoacetanilide | 3 |
| Resorcinol | 1 |
| Sodium lauryl sulphate | 0.2 |

The developed diazotype copy showed a dark yellow image on a clear background. The yellow image has a high actinic opacity and gives a subsequent print of great contrast.

What we claim and desired to secure by Letters Patent is:

1. Diazonium compounds derived from amines of the general formula:

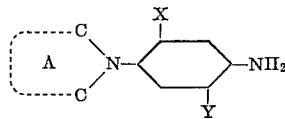

(I)

wherein A represents a heterocyclic ring containing at most, one hetero atom, in addition to the nitrogen, X is a lower alkoxy group and Y is chosen from the group consisting of

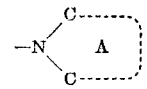

in which A has the same significance as above, alkylthio and arylthio groups.

2. Diazotype materials comprising a support having a light-sensitive layer containing a light-sensitive diazonium compound taken from the group of compounds claimed in claim 1.

3. Compounds according to claim 1, wherein A is a morpholine ring.

4. Compounds according to claim 1, wherein A is a piperidine ring.

5. Compounds according to claim 1, wherein A is a piperazine ring.

6. Compounds according to claim 1, wherein A is a pyrrolidine ring.

7. 4-N-piperidino-3-methoxy-6-para-toluene thio-benzene diazonium chloride, zinc chloride double salt.

8. 4-N-piperidino-3-methoxy-6-piperidino-benzene diazonium chloride, zinc chloride double salt.

References Cited

UNITED STATES PATENTS

| | | | |
|---|---|---|---|
| 2,551,133 | 5/1951 | Bradshaw et al. | 96—91 X |
| 2,665,985 | 1/1954 | Sus | 96—91 |
| 3,028,240 | 3/1962 | Werner et al. | 96—91 |
| 3,113,022 | 12/1963 | Cassiers et al. | 96—91 X |
| 3,164,469 | 1/1965 | Behmenburg et al. | 96—91 X |
| 3,186,845 | 6/1965 | Sus et al. | 96—91 |
| 3,281,245 | 10/1966 | Werner et al. | 96—75 X |

FOREIGN PATENTS

| | | |
|---|---|---|
| 853,020 | 11/1960 | Great Britain. |
| 864,011 | 3/1961 | Great Britain. |
| 937,510 | 9/1963 | Great Britain. |

NORMAN G. TORCHIN, *Primary Examiner.*

C. L. BOWERS, *Assistant Examiner.*